United States Patent [19]

Yamato et al.

[11] Patent Number: 5,460,868
[45] Date of Patent: Oct. 24, 1995

[54] METHOD FOR USING MOLDING

[75] Inventors: Hiroyasu Yamato; Masami Mihara, both of Ichihara; Atsushi Fujii, Himeji, all of Japan

[73] Assignee: Idemitsu Kosan Co., Ltd., Tokyo, Japan

[21] Appl. No.: 937,417

[22] Filed: Aug. 31, 1992

[30] Foreign Application Priority Data

Sep. 12, 1991 [JP] Japan .................................. 3-232680
Oct. 24, 1991 [JP] Japan .................................. 3-277414

[51] Int. Cl.⁶ ........................ B32B 27/30; B32B 15/08; C08F 279/04
[52] U.S. Cl. ........................ 428/212; 428/215; 428/333; 428/411.1; 428/421; 428/422; 428/517; 428/519
[58] Field of Search .................... 428/212, 215, 428/411.1, 519, 517, 421, 422, 333

[56] References Cited

U.S. PATENT DOCUMENTS 5,283,117  2/1994  Arai et al. .............................. 428/343

FOREIGN PATENT DOCUMENTS

| 0337316 | 10/1989 | European Pat. Off. . |
| 0431166 | 6/1991 | European Pat. Off. . |
| 61-209240 | 9/1986 | Japan . |
| 62-28240 | 2/1987 | Japan . |
| 61-284906 | 11/1990 | Japan . |

OTHER PUBLICATIONS

Database WPIL, AN–91–203016, JP–A–3 126 555, May 29, 1991.
Database WPIL, AN–91–202987, JP–A–3 126 521, May 29, 1991.

*Primary Examiner*—Sluby P. C.
*Attorney, Agent, or Firm*—Oblon, Spivak, McClelland, Maier & Neustadt

[57] ABSTRACT

There are disclosed a method for using a molding which comprises using a molding produced by thermoforming a sheet for thermoforming comprising a styrenic polymer having a high degree of syndiotactic configuration or a composition thereof in an atmosphere containing a chlorofluorohydrocarbon and also a method for using a molding which comprises using a molding produced by thermoforming a laminate comprising at least one surface layer of the above styrenic polymer or a composition thereof and an other layer of a thermoplastic resin or a composition thereof in an atmosphere the same as above-mentioned.

The moldings to be employed in the present invention are excellent in chemical resistance, solvent resistance and resistance against CFC and HCFC, and the sheet for thermoforming and the laminate are useful as the starting raw materials for the aforesaid molding.

According to the present invention, the moldings can be used without any problem as the inner liners of refrigerators (including internals inside door) in an atmosphere of chlorofluorohydrocarbon or in contact with heat-insulating material such as polyurethane foam, and the scrap resins at the time of molding can be recovered and readily reused.

9 Claims, No Drawings

METHOD FOR USING MOLDING

BACKGROUND OF THE INVENTION

1. Field of the Invention

The present invention relates to a method for using a molding. More particularly, it pertains to a method for using a molding excellent in chemical, solvent, chloroflurocarbon and hydrochlorofluorocarbon resistances.

2. Description of Related Art

Since trichloromonofluoromethane (CFC11) which is widely used for thermal insulation foam of refrigerators threatens destruction of the ozone layer, it is intended worldwide to be replaced with 1,1-dichloro-2,2,2-trifluoroethane (HCFC 123) or 1,1-dichloro-1-fluoroethane (HCFC 141b) at the present time. However, the aforementioned HCFC 123 and HCFC 141b have each higher solubilities for various resins than those of the previous chlorofluorocarbon such as CFC 11. Accordingly, acrylonitrile/butadiene/styrene (ABS) resin and high impact resistant polystyrene (HIPS) that are generally used for the inner liner of a refrigerator at present can not withstand the combined use with polyurethanes containing HCFC 123 or HCFC 141b in direct contact therewith.

Moreover as the environmental preservation problem, the proceeding of recovery and reuse of waste plastics has recently become the worldwide subject for a future study.

Under such circumstances, there are proposed an ABS resin with a high content of acrylonitrile (Japanese Patent Application Laid-Open No. 284906/1990) and a polyolefinic resin composition (Japanese Patent Application Laid-Open No. 209240/1986) as a material to be used for the inner liner of a refirgerator which is resistant against chlorofluorocarbons and hydrochlorofluorocarbons.

Although somewhat improved in the resistance against such (hydro)chlorofluorocarbons, the above-mentioned ABS resin is not sufficiently improved in the resistance; besides the use of excess acrylonitrile in ABS resin to be used as a refrigerator member causes unfavorable odor as well as a working environmental problem in that the acrylonitrile is liberated from the ABS resin at the time of heating for recovery.

On the other hand, since the aforesaid polyolefinic resin composition is used in the form of a mixture with a resin other than a styrenic resin, for example, by being compounded with an acrylic polymer for the main purpose of improving the adhesivity to the polyurethane foam, the use of the composition is greatly limited in the case of recovery and reuse thereof.

In addition, there is proposed a multi-layer structure of a polyolefinic resin and other resin (Japanese Patent Application Laid-Open No. 28240/1987), but the difficulty in recovery and reuse thereof is not improved at all as compared with that of the above-mentioned mixture of the composition.

In view of the aforestated circumstances facing such difficulty, intensive research and investigation were concentrated by the present inventors on the development of a molding which is easy in recovery and reuse, usable in a chlorofluorohydrocarbon atmosphere and resistant to alternative (hydro)chlorofluorocarbons by adopting syndiotactic polystyrene excellent in chemical and solvent resistances as the material for the inner liner of a refrigerator.

As a result it has been discovered that the sheet for thermoforing comprising as the primary ingredient a syndiotactic polystyrene having a high degree of syndiotactic configuration, a weight-average molecular weight of at least 100,000 and a crystallinity within a definite range, and laminate containing at least one layer comprising such syndiotactic configuration as the primary ingredient are effective as the raw material for the molding and also that the molding made of the aforesaid sheet for thermoforming or the laminate by means of thermoforming is well suited for attaining the purpose of the development. The present invention has been accomplished on the basis of the above-described finding and information.

SUMMARY OF THE INVENTION

Specifically, the present invention provides a method for using a molding which comprises bringing a molding thermoformed from a sheet for thermoforming comprising a styrenic polymer having a high degree of syndiotactic configuration or a composition thereof into use in a (hydro-)chlorofluorohydrocarbon atmosphere. Furthermore, it also provides a method for using a molding which comprises bringing a molding thermoformed from a laminate comprising at least one surface layer of the above-mentioned styrenic polymer or a composition thereof and at least one layer of a thermoplastic resin or a composition thereof into use in a (hydro)chlorofluorohydrocarbon atmosphere.

DESCRIPTION OF PREFERRED EMBODIMENT

The present invention is characterized by the application of a styrenic polymer having a high degree of syndiotactic configuration (SPS) to the molding material for a molding, which SPS may be used alone or as the composition with a rubber or other thermoplastic resin compounded therwith for the purpose of improving impact resistance, moldability, etc. to the extent that the addition thereof does not impair the effect of the present invention.

Here, the styrenic polymer which has a high degree of syndiotactic configuration means that its stereochemical structre is of high degree of syndiotactic configuration, i.e. the stereostructure in which phenyl groups or substituted phenyl groups as side chains are located alternately at opposite directions relative to the main chain consisting of carbon-carbon bonds. The tacticity thereof is quantitatively determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. The styrenic polymers having such a high degree of syndiotactic configuration as mentioned in the present invention usually means polystyrene, poly(alkylstyrene), poly(halogenated styrene), poly(halogenated alkylstyrene), poly(alkoxystyrene), poly(vinyl benzoate), hydrogenated polymer thereof, the mixture thereof, and copolymers containing the above polymers as main components, having such a syndiotacticity that the proportion of racemic diad is at least 75%, preferably at least 85%, or the proportion of racemic pentad is at least 30%, preferably at least 50%. The poly(alkylstyrene) includes poly(methylstyrene), poly(ethylstyrene), poly(isopropylstyrene), poly(tert-butylstyrene), poly(phenylstyrene), poly(vinyl naphthalene) and poly(vinyl styrene). Poly(halogenated styrene) includes poly(chlorostyrene), poly(bromostyrene), and poly(fluorostyrene). Poly(halogenated alkylstyrene) includes poly(chloromethyl styrene), etc. Poly(alkoxystyrene) includes poly(methoxystyrene), and poly(ethoxystyrene). Examples of the comonomer which constitutes the copolymer having one of the constitutional units include olefinic monomer such as ethylene, propylene, butene, hexene and octene, diolefinic monomer such as butadiene and isoprene, cyclic olefinic monomer, cyclic diolefinic monomer and polar vinylic monomer such as methyl methacrylate, maleic anhydride and acrylonitrile. Among the above-mentioned styrenic polymers are particularly desirable polystyrene, poly(alkylstyrene), poly(halogenated styrene), hydrogenated polystyrene and the copolymer having one of the constitutional units.

Such styrenic polymers each having a syndiotactic configuration can be produced by polymerizing a styrenic monomer which corresponds to the above styrenic polymer in the presence or absence of a solvent such as an inert hydrocarbon by the use of a catalyst comprising a titanium compound and a condensation product of water and a trialkylaluminium (Japanese Patent Application Laid-Open No. 187718/1987). The poly(halogenated alkylstyrene) and hydrogenated polymer thereof can be produced by the processes described in Japanese Patent Application Laid-Open Nos. 46912/1989 and 178505/1989, respectively.

The weight-average molecular weight of the styrenic polymer having syndiotactic configuration (SPS) shall be at least 100,000, preferably 150,000 to 2,000,000. A weight-average molecular weight less than 100,000 will cause a large drawdown at the time of heating, thus making it impossible to produce a favorable form-reproducibility in the case of thermoforming.

The aforestated styrenic polymer may be compounded with a rubber or other thermoplastic resin to utilize as a composition. The type of the rubber compoundable therewith is not limited but may be available from a variety of rubbers, of which are most suitable a rubbery copolymer comprising a styrenic compound as one of the components, exemplified by styrene/butadiene copolymer rubber (SBR), styrene/butadiene block copolymer (SB, SBS, BSB), styrene/hydrogenated-butadiene block copolymer (SEBS, SEB), styrene/isoprene block copolymer (SI, SIS, ISI), styrene/hydrogenated-isoprene block copolymer (SEP, SEPS); and granular elastomer obtained by polymerizing a vinylic monomer in the presence of a polymer obtained by polymerizing at least one monomer selected from the group consisting of alkyl acrylate, alkyl methacrylate and a polyfunctional monomer having a conjugated type double bond, exemplified by acrylonitrile/styrene grafted butadiene rubber (ABS), acrylonitrile/styrene-grafted butadiene/butyl acrylate copolymer rubber (AABS), methyl methacrylate/styrene-grafted butadiene rubber (MAS), styrene grafted butadiene rubber (SB), methyl methacrylate/styrene-grafted butadiene rubber (MBS) and methyl methacrylate/styrene-grafted butadiene/butyl acrylate copolymer rubber (MABS).

In addition, other examples of rubber include A-B type block copolymer and at least one block or graft copolymer selected from A-B type block copolymer, A-grafted B copolymer and B-grafted A copolymer in which A represents at least one styrenic polymer or styrenic copolymer selected from atactic polystyrene, acrylonitrile/styrene random copolymer, styrene/maleic anhydride random copolymer, styrene/acrylonitrile/maleimide anhydride random copolymer and styrene/methyl methacrylate random copolymer and B designates at least one polymer selected from polybutadiene, polyisoprene, hydrogenated polybutadiene, hydrogenated polyisoprene and polycarbonate and at least one polymer selected from polyamide, poly(methyl methacrylate), polyethylene terephthalate and polybutylene terephthalate. The rubbery copolymer comprising a styrenic compound as one of the components has favorable dispersibility in a SPS because of its having a styrenic unit and as a result is markedly improved in physical properties.

Other examples of usable rubbers in addition to the foregoing include natural rubber, polybutadiene, polyisoprene, polyisobutylene, neoprene rubber, ethylene/propylene copolymer rubber, polysulfide rubber, thiokol rubber, acrylic rubber, urethane rubber, silicone rubber, epichlorohydrin rubber, polyether ester rubber and polyester ester rubber, and also usable is a rubber modified by reacting with a polar group used for introducing a polar group of a polyphenylene ether having the polar group and a compound having an unsaturated group.

The type of the other thermoplastic resin compoundable with the styrenic polymer is not limited but may be available from a variety of resins exemplified by atactic styrenic polymer, isotactic styrenic polymer, polyphenylene ether and styrene/maleic acid anhydride copolymer. The above-exemplified thermoplastic resins are easily compatible with the styrenic polymer having syndiotactic configuration (SPS) and effective for easily controlling the crystallization and molding conditions, enabling the production of a molding excellent in dynamic properties. In the case where an atactic or isotactic styrenic polymer is incorporated with SPS, the polymer preferably comprises the monomer same as that of the SPS. The content of the compoundable or compatible resin is desirably 70 to 1%, particularly desirably 50 to 2% by weight based on the SPS. A content exceeding 70% by weight is unfavorable, since it impairs resistance to (hydro)chlorofluorocarbon that is one of the advantages of the SPS.

Examples of incompatible resins with SPS include polyolefin such as polyethylene, polypropylene, polybutene and polypentene; polyester such as polyethylene terephthalate, polybutylene terephthalate and polyethylene naphthalate; polyamide such as nylon 6 and nylon 6,6; polythioether such as polyphenylene sulfide; polycarbonate; polyarylate; polysulfone; polyetheretherketone; polyether sulfone; polyimide; halogenated vinylic polymer such as Teflon; acrylic polymer such as poly(methyl methacrylate); and polyvinyl alcohol; that is, all of the resins other than the above-mentioned compatible resins falling under the scope of incompatible resins, and crosslinked resin containing a compatible resin. In the case where the foregoing incompatible resin, that is, incompatible with SPS, is incorporated in a small amount in SPS, it can be dispersed in SPS just like islands in the sea because of its incompatibility. The result is useful in providing the oriented resin with favorable gloss or in improving surface slipperiness of the resin. The content of the incompatible resin component is preferably 50 to 2% by weight for the purpose of glossiness and 0.001 to 5% by weight for the purpose of controlling the surface property. In the case of the resin product being used at a higher temperature, the incompatible resin which is relatively heat resistant is preferably employed.

In the present invention, the molding is obtained by thermoforming a sheet for thermoforming which comprises molded SPS or composition thereof. The molding thus obtained is excellent in resistance against (hydro)chlorofluorocarbon, especially alternative hydrochlorofluorocarbon (HCFC) such as HCFC 123. The crystallinity of the sheet for thermoforming which is the starting material for the molding is 30% or less, preferably 25% or less. Taking into consideration the cases of producing various moldings by various molding methods by the use of the sheet for thermoforming as the starting material, a crystallinity thereof exceeding 30% is unfavorable, since it will result in failure to provide sufficient tensile elongation properties required at the time of pressure, vacuum or pressure-vacuum forming. In addition, the sheet thickness is 5 mm or less, preferably 3.5 mm or less. A sheet thickness more than 5 mm increases the difference in cooling rate during cooling between the deep part in the sheet and the surface part therein and unreasonably increases the unevenness in crystallinity, thus making it difficult to provide favorable thermoformability.

In forming the sheet for thermoforming, the heat-molten raw material for forming may be formed into a prescribed shape by means of a T-die. The usable extruding machines include a single-screw extruder and twin-screw extruder each with or without a vent. The extrusion conditions are not specifically limited but may be suitably selected according to the various conditions, and preferably set on a temperature at least 5° C. higher than the melting point of SPS and on a shear stress of $5 \times 10^6$ dyne/cm$^2$ or less so as afford a sheet minimized in surface roughening.

After the above-mentioned extrusion, the sheet thus obtained is cooled for solidification as necessary by the use of one of the various refrigerants available such as gas, liquid and metal. In the case of a metallic roll being used, the application of an air knife, an air chamber, a touch roll or electrostatic charging is effective in preventing unevenness of thickness and waviness of the sheet. The solidification is carried out usually at a temperature ranging from 0° C. to the temperature 30° C. higher than the glass transition temperature of the sheet, preferably ranging from the temperature 70° C. lower than the above glass transition temperature to the above glass transition temperature. The cooling rate is usually selected in the range of 200° C. to 2° C. per second.

The molding to be employed in the present invention is obtained by thermoforming the resultant sheet under pressure by the use of a mold with an expected shape. As the molding equipment to be employed therefor, a molding machine of the type previously used in general may be used as such.

Pressurizing may be carried out in the same manner irrespective of the presence and absence of a plug by suitable combination of at least two from plug, vacuum, pressure and vacuum-pressure. The method for heating the sheet is not specifically limited but may be suitably selected from, for example, indirect heating with a ceramics-sealed electric heater or hot oil and direct heating in which the sheet is brought into direct contact with a heated plate or the like. The heating temperature shall be in the range of the glass transition temperature of the raw material (Tg) to the temperature 15° C. lower than the melting point thereof (Tm), (Tm−15)°C., preferably (Tg+10)°C. to (Tg+120)°C. A heating temperature lower than Tg makes it difficult to effect sufficient molding, whereas that higher than (Tm−15)°C. will cause brigding or, when a plug is used, adhesion of the material to the plug.

During the aforestated molding step, the mold temperature is preferably in the range of 30° C. to (Tm−15)°C., since a mold temperature lower than 30° C. makes it difficult to effect crystallization sufficient for providing the molding with resistance against CFC or HCFC, while that higher than (Tm−15)°C. will cause adhesion of the material to the mold or poor mold releasing.

It has been discovered that the resistance against CFC or HCFC of the molding thus obtained is closely related to the crystallinity of the SPS after the final thermoforming of the sheet. Specifically, the crystallinity required for the sufficient resistance against CFC or HCFC is 15%, desirably 20%, particularly desirably 25%, each at the least. A crystallinity less than 15% in a molding not only decreases the strength and modulus of elasticity of the molding owing to the influenece by CFC or HCFC but also causes non-negligible dissolution of the molding in CFC or HCFC. The crystallinity of the molding can be favorably controlled by setting the conditions at the time of thermoforming such as the temperature and preservation time for sheet heating, mold temperature and preservation time and the like.

The molding to be used in the present invention can be obtained also by thermoforming a laminate which comprises at least one surface layer, that is, one surface layer or both surface layers comprising the above-described SPS or a composition containing SPS, and at least one other layer, that is, intermediate layer(s) or a surface layer of other than SPS layer comprising a thermoplastic resin or a composition containing the same.

The thermoplastic resin to be employed as the other layer constituting the aforementioned laminate may be compounded with rubber or the like when desired. In the case of producing the molding by means of vacuum, pressure or vacuum-pressure forming, it is preferable to use a thermoplastic resin capable of readily providing a large deformation under heat. The thermoplastic resin to be employed in the present invention is not specifically limited in the type thereof, but is most desirably a styrenic resin such an atactic polystyrene, isotactic polystyrene, impact resistant polystyrene, AS (acrylonitrile/styrene) resin or ABS (acrylonitrile/butadiene/styrene) resin, or the resin usually incorporated into polystyrene resin exemplified by polyphenylene ether (PPE) taking into consideration the objective recovery and reuse of the scrap resin. The thermoplastic resin may be used alone or in combination with at least one other resin or formed into a laminate in which the resin is bonded to at least one other resin.

Examples of rubber which may be compounded with the above-mentioned thermoplastic resin are the same as described hereinbefore.

The laminate consisting of the surface layers at least one of which comprises SPS as the principal component and other layer(s) comprising a thermoplastic resin as the principal component can be produced by the appropriate combination of the conventional methods according to the configuration of the objective laminate. Specifically, mention may be made of the methods (1), (2) and (3) for producing the laminate as follows:

In method (1) SPS and a thermoplastic resin are subjected to co-extrusion by using a molding machine with a multi-channel die, followed by solidification to form a multi-layer cast sheet, during which time an adhesive layer as the third component having affinities for each of the SPS layer and thermoplastic layer may be interposed between the above layers, or at least one of the SPS layer and the thermoplastic layer may be previously compounded with an adhesive material to enhance interlaminar adhesion.

In method (2), an oriented or non-oriented film or sheet of SPS is formed in advance and bonded to a thermoplastic resin extruded in the molted state from an extruder with a T-die, followed by solidification or conversely, an oriented or non-oriented film or sheet of a thermoplastic resin is formed in advance and bonded to SPS in molten state, followed by solidification, during which time, as is the case with the aforesaid method (1), the adhesive layer may be interposed between the two layers or the adhesive material may be compounded to enhance interlaminar adhesion.

In method (3), an oriented or non-oriented films or sheets, one from SPS and the other from a thermoplastic resin are each separately formed and are made into a laminate by means of compression under heat. Prior to the lamination step, each film or sheet may be pretreated by corona discharge treated, or ozone treated or the like, and an interlaminar adhesive, for example, an adhesive for dry lamination such as curable urethane-based adhesive may be applied. The suitable laminating conditions include a press-roll temperature of 120° to 240° C., approximately and a processing velocity of 50 to 150 m/min.

In any of the aforestated methods for producing a laminate, the sheet or film is cooled for solidification by the use of one of the various refrigerants available such as gas, liquid and metal. In the case of a metallic roll being used, the application of an air knife, an air chamber, a touch roll or electrostatic charging is effective in preventing unevenness of thickness and waviness of the film or sheet. The solidification is carried out usually at a temperature ranging from 0° C. to the temperature 30° C. higher than the glass transition temperature (Tg) of SPS, preferably ranging from the temperature 70° C. lower than the Tg to the Tg of SPS. The cooling rate is usually selected in the range of 200° C. to 2° C. per second.

In the laminate produced by any of the above-mentioned method (1), (2) and (3), the crystallinity of the layer comprising SPS or a composition containing the SPS before thermoforming is desirably 30% or less, particularly desirably 25% or less, since a crystallinity thereof exceeding 30% will result in failure to provide sufficient tensile elongation properties required at the time of pressure, vacuum or pressure-vacuum forming.

The thickness of each of the surface layers comprising SPS as the primary component shall be 5 mm or less, preferably 3.5 mm or less. A thickness thereof more than 5 mm is unfavorable, since it increases the difference in cooling rate during cooling between the deep part in the sheet and the surface part therein and unreasonably increases the unevenness in crystallinity, thus making it difficult to provide favorable thermoformability.

The molding using the resultant laminate is obtained by thermoforming the laminate under pressure by the use of a mold with a prescribed shape. As the molding equipment to be employed therefor, a molding machine of the type previously used in general may be used as such. Pressurizing may be carried out in the same manner irrespective of the presence and absence of a plug by suitable combination of at least two from plug, vacuum, pressure and vacuum-pressure. The method for heating the laminate is not specifically limited but may be suitably selected from, for example, indirect heating with a ceramics-sealed electric heater or hot oil and direct heating in which the sheet is brought into direct contact with a heated plate or the like. The heating temperature varies depending on the type of the thermoplastic resin to be employed but shall be in the range of the glass transition temperature of SPS (Tg) to the temperature 15° C. lower than the melting point thereof (Tm), (Tm−15)°C., preferably (Tg+10)°C. to (Tg+120)°C. in order to assure the moldability of the surface layer comprising SPS as the primary component. A heating temperature lower than Tg makes it difficult to effect sufficient molding, whereas that higher than (Tm−15)°C. will cause bridging in the surface layer comprising SPS or, when a plug is used, adhesion of the material to the plug.

It is desirable that the other layer comprising a thermoplastic resin or a composition containing the same be capable of being deformed under the same conditions as above simultaneously with the surface layer comprising SPS as the primary component. By the aforesaid reason, the thermoplastic resin to be employed shall have a glass transition temperature of not higher than (Tm−15)°C., preferably not higher than (Tg+120)°C. The usable resins under such a condition include, in addition to those described hereinbefore, polyethylene, polypropylene, polybutene, polyvinyl chloride, polyethylene terephthalate, polybutylene terephthalate, polyethylene naphthalate, polyamide 6, polyamide 6,6, polycarbonate, polyphenylene sulfide, polysulfone, poly(methyl methacrylate) and modified polyphenylene ether and the like.

During the aforestated molding step, the mold temperature is preferably in the range of 30° C. to (Tm−15)°C., since a mold temperature lower than 30° C. makes it difficult to effect crystallization sufficient for providing the molding with resistance against CFC or HCFC, while that higher than (Tm−15)°C. will cause adhesion of the material to the mold or poor mold releasing on the surface layer comprising SPS as the primary component.

It has been discovered that the resistance against CFC or HCFC of the molding to be used in the present invention is closely related to the crystallinity of the SPS after the final thermoforming of the laminate. Specifically, the crystallinity required for the sufficient resistance against CFC or HCFC is 15%, desirably 20%, particularly desirably 25%, each at the least. A crystallinity less than 15% in a molding not only decreases the strength and modulus of elasticity of the molding owing to the influence by CFC or HCFC but also causes non-negligible dissolution of the molding in CFC or HCFC. The crystallinity of the molding obtained after thermoforming of SPS can be favorably controlled by setting the conditions at the time of thermoforming such as the temperature and preservation time for sheet heating, mold temperature and preservation time and the like.

The molding obtained from the sheet for thermoforming or laminate each comprising SPS as the principal component is surpassingly excellent in the resistance against CFC and HCFC and well suited for use in the members in contact with CFC or HCFC such as the inner liner of a refrigerator (including internals inside the door) and portable cooler box.

Furthermore, the above-stated molding has the advantages as described hereunder.

In a step of producing a molding by thermoforming a raw resin material in the form of sheet, a step of cutting off the peripheral part of the molding is indispensable as a general rule. The trimming loss during the cutting off step is sometimes as high as 30% of the total resin requirement and therefore, utmost importance is attached to the recovery for reuse of the scrap material in view of not only the production cost but also the enviromental problem.

Although a multi-layered laminate has been considered to be in the difficult form to be recovered for reuse, the difficulty can be overcome by the present invention in the following manner. Specifically, a styrenic polymer having a high degree of syndiotactic configuration (SPS) can be compatibilized with other styrenic polymer such as atactic polystyrene, isotactic polystyrene, ABS resin and AS resin in an arbitrary proportion by means of heat-melting and kneading. In this case, by appropriately selecting the blending ratio of the SPS, for example, at 30% by weight or less, the mixture containing the SPS which is extremely lowered in crystallinity is provided with the physical properties close to those of the mixture containing the same amount of atactic polystyrene in place of the SPS. Accordingly, the laminate of SPS layer combined with the layer of AS resin or ABS resin, when reheated and blended for the purpose of recovery for reuse, can be treated in the same manner as the general composition of AS/polystyrene or ABS/polystyrene. In particular in the case of the laminate of SPS combined with atactic polystyrene, the recovered material can be reused as such as atactic polystyrene, thereby greatly facilitating the recovery and reuse of the laminate which has been difficult with the conventional method.

In the method according to the present invention, the molding resistant against CFC and HCFC is employed in an atmosphere of chlorofluorohydrocarbon such as for the inner liner of a refrigerator (inlcuding internals inside the door) and portable cooler box.

A variety of chlorofluorohydrocarbons are available and exemplified by 1,1-dichloro-2,2,2-trifluoroethane (HCFC 123), 1,1-dichloro-1-fluoroethane (HCFC 141b), difluoromethane (HCFC 22), 1,1-difluoro-1-chloroethane (HCFC 142b) and 1,1,2-tetrafluoro-2-chlororethane (HCFC 124) each being brought into use by virtue of the excellent heat-insulating property as the alternative to the previous blowing agent.

The prominent resistance against CFC and HCFC exhibited by the molding in the present invention when it is used in an atmosphere of chlorofluorohydrocarbon is attributable to the application of a styrenic polymer having a high degree of syndiotactic configuration.

In the following, the present invention will be described in more detail with reference to a reference example, preparation examples, examples and comparative examples.

REFERENCE EXAMPLE 1

In a 500 ml glass vessel which had been purged with argon were placed 17.8 g (71 mmol) of copper sulfate pentahydrate ($CuSO_4 \cdot 5H_2O$), 200 ml of toluene and 24 ml (250 mmol) of trimethylaluminum, which were then reacted at 40° C. for 8 hours. Then, the solids were separated from the reaction mixture and the toluene in the solution was distilled away under reduced pressure to obtain 6.7 g of a condensation product. The molecular weight thereof as determined by the freezing point depression method was 610.

PREPARATION EXAMPLE 1

In a 2 L reaction vessel were placed 1 L of purified styrene, the condensation product as obtained in the above Reference Example 1 in an amount of 5 mmol as aluminum atom, 5 mmol of triisobutylaluminum and 0.025 mmol of pentamethylcyclopentadienyltitanium trimethoxide, which were then subjected to polymerization reaction at 90° C. for 5 hours. After the completion of the reaction, the catalytic components were decomposed with a solution of sodium hydroxide in methanol and then the reaction product was washed with methanol repeatedly and dried to afford 308 g of polymer. As the result of analysis by gel permeation chromatography using 1,2,4-trichlorobenzene at 135° C. as the solvent, the polymer thus produced had a weight-average molecular weight of 389,000 and a ratio of weight-average molecular weight to number-average molecular weight of 2.64.

It was confirmed that the polymer was polystyrene having syndiotactic configuration (SPS) from the results of melting point measurement and $^{13}$C-NMR analysis.

PREPARATION EXAMPLE 2

In a 2 L reaction vessel were placed 965 ml of purified styrene, 70 ml of p-methylstyrene, the contact product as obtained in the above Reference Example 1 in an amount of 5 mmol as aluminum atom, 7.5 mmol of triisobutylaluminum and 0.038 mmol of pentamethylcyclopentadienyltitanium trimethoxide, which were then subjected to polymerization reaction at 90° C. for 5 hours. After the completion of the reaction, the catalytic components were decomposed with a solution of sodium hydroxide in methanol and then the reaction product was washed with methanol repeatedly and dried to afford 308 g of polymer. As the result of analysis by gel permeation chromatography using 1,2,4-trichlorobenzene at 135° C. as the solvent, the polymer thus produced had a weight-average molecular weight of 440,000 and a ratio of weight-average molecular weight to number-average molecular weight of 2.52.

It was confirmed that the polymer was styrene/p-methylstyrene copolymer having syndiotactic configuration from the results of melting point measurement and $^{13}$C-NMR analysis. The results of $^1$H-NMR analysis showed a p-methylstyrene content in the copolymer of 7.1 mol %.

EXAMPLE 1

A blend of 80% by weight of SPS as obtained in the Preparation Example 1 and 20% by weight of styrene/butadiene block copolymer (produced by Bayer AG as grade No. BL-6533) was kneaded then extruded into pellet by the use of a twinscrew extruder. The resultant pellet was extruded by the use of a single-screw extruder equipped with a T-die at the end thereof at an extrusion temperature of 320° C. and a shear stress of $3\times10^5$ dyne/cm$^2$.

The melt-extruded resin was electrostatically charged and placed closely in contact with a metallic cooling roll adjusted to 60° C. to produce a sheet of 2 mm thickness.

The crystallinity of the molding (sheet) was measured with a differential scanning calorimeter (DSC). Specifically, the endothermic enthalpy at the melting point measured under a difinite temperature rise rate ($\Delta Hm$) and the exothermic enthalpy at the cold crystallization temperature ($\Delta Hcc$) were obtained, and the crystallinity (Xc) was determined based on the fusion enthalpy at 100% crystallinity ($\Delta Hf=53$ J/g) and the content of SPS by weight in the molding (C) by the following formula:

$$Xc=(\Delta Hm-\Delta Hcc)/\Delta Hf\times C$$

The crystallinity of the resultant sheet as calculated by the above formula was 15%.

Then, the sheet was indirectly heated from both the sides with an electric heater, during which the surface temperature of the sheet as measured with a non-contact thermometer was 130° C. Subsequently the sheet was thermoformed at a compressed air pressure of 3 kg/cm$^2$ by the use of a pressure forming apparatus with a mold having a 100 mm×50 mm opening and a depth of 40 mm at a mold temperature adjusted to 160° C. The thermoformed molding had a crystallinity of 44%.

The resistance against CFC and HCFC of the thermoformed molding as the sample was evaluated by immersing the sample in HCFC 123 adjusted to 23° C. for 24 hours, thereafter air-drying the sample for 24 hours and measuring the changes in the tensile strength and tensile modulus of elasticity of the sample. The swell of the sample was obtained as the rate of weight change during the immersing treatment. The results are given in Table 1. Likewise, the molding sample was exposed to HCFC 123 vapor at 23° C. and atmospheric pressure for 24 hours. The results are given in Table 2.

EXAMPLE 2

The procedure in Example 1 was repeated except that the mold temperature was adjusted to 130° C. at the time of pressure forming to produce a molding. The results obtained are given in Table 1 and Table 2.

EXAMPLE 3

The procedure in Example 1 was repeated except that the mold temperature was adjusted to 90° C. at the time of pressure forming to produce a molding. The results obtained are given in Table 1 and Table 2.

EXAMPLE 4

The procedure in Example 1 was repeated except that the mold temperature was adjusted to 50° C. at the time of pressure forming to produced a molding. The results obtained are given in Table 1 and Table 2.

EXAMPLE 5

The procedure in Example 1 was repeated except that styrene/hydrogenated butadiene block copolymer (produced by Shell Chemical Corporation as grade No. G-1651) was used in place of styrene/butadiene block copolymer to produce a molding. The results obtained are given in Table 1 and Table 2.

EXAMPLE 6

The procedure in Example 1 was repeated except that styrene/butadiene copolymer (produced by Nippon Zeon Co., Ltd. under the tradename NIPOL 1006) was used in place of styrene/butadiene block copolymer to produce a molding. The results obtained are given in Table 1 and Table 2.

EXAMPLE 7

The procedure in Example 1 was repeated except that styrene/p-methylstyrene copolymer obtained in Preparation Example 2 was used in place of SPS to produce a molding. The results obtained are given in Table 1 and Table 2.

COMPARATIVE EXAMPLE 1

The procedure in Example 1 was repeated except that ABS resin (produced by Mitsubishi Monsanto Chemical Co., Ltd. as grade No. YT-212) was used as the starting raw resin at the time of sheet forming, the extrusion temperature was set at 230° C. at the time of sheet forming and the mold temperature was set at 50° C. at the time of pressure forming to produce a molding. The results obtained are given in Table 1 and Table 2.

COMPARATIVE EXAMPLE 2

The procedure in Example 1 was repeated except that impact resistant atactic polystyrene resin (produced by Idemitsu Petrochemical Co., Ltd. as grade No. ET-60) was used as the starting raw resin at the time of sheet forming, the extrusion temperature was set at 220° C. at the time of sheet forming and the mold temperature was set to 50° C. at the time of pressure forming to produce a molding. The results obtained are given in Table 1 and Table 2.

TABLE 1

|  | Swell of HCFC absorption (%) | Crystallinity after thermoforming (%) | Tensile strength | | | Tensile modulus of elasticity | | |
| --- | --- | --- | --- | --- | --- | --- | --- | --- |
|  |  |  | Before immersion kg/cm$^2$ | After immersion kg/cm$^2$ | Retention (%) | Before immersion kg/cm$^2$ | After immersion kg/cm$^2$ | Retension (%) |
| Example 1 | 1.2 | 44 | 354 | 334 | 94 | 24,800 | 24,000 | 97 |
| Example 2 | 8.5 | 30 | 356 | 283 | 80 | 24,800 | 20,200 | 81 |
| Example 3 | 15.6 | 28 | 355 | 229 | 65 | 24,500 | 16,300 | 67 |
| Example 4 | 18.8 | 26 | 346 | 211 | 61 | 24,800 | 14,800 | 60 |
| Example 5 | 1.2 | 51 | 335 | 325 | 97 | 24,200 | 23,700 | 98 |
| Example 6 | 0.7 | 48 | 275 | 267 | 97 | 22,100 | 21,100 | 95 |
| Example 7 | 4.1 | 38 | 382 | 329 | 86 | 23,900 | 21,700 | 91 |
| Comparative Example 1 | | | Not measurable due to complete dissolution | | | | | |
| Comparative Example 2 | | | Not measurable due to complete dissolution | | | | | |

TABLE 2

|  | Swell of HCFC absorption (%) | Crystallinity after thermoforming (%) | Tensile strength | | | Tensile modulus of elasticity | | |
| --- | --- | --- | --- | --- | --- | --- | --- | --- |
|  |  |  | Before exposure kg/cm$^2$ | After exposure kg/cm$^2$ | Retention (%) | Before exposure kg/cm$^2$ | After exposure kg/cm$^2$ | Retension (%) |
| Example 1 | 0.1 | 44 | 354 | 334 | 94 | 24,800 | 24,300 | 98 |

TABLE 2-continued

|  | Swell of HCFC absorption (%) | Crystallinity after thermoforming (%) | Tensile strength | | | Tensile modulus of elasticity | | |
|---|---|---|---|---|---|---|---|---|
|  |  |  | Before exposure kg/cm² | After exposure kg/cm² | Retention (%) | Before exposure kg/cm² | After exposure kg/cm² | Retension (%) |
| Example 2 | 4.5 | 30 | 356 | 299 | 84 | 24,800 | 22,500 | 91 |
| Example 3 | 7.9 | 28 | 355 | 265 | 75 | 24,500 | 20,900 | 85 |
| Example 4 | 10.0 | 26 | 346 | 173 | 50 | 24,800 | 20,500 | 83 |
| Example 5 | 0.2 | 51 | 335 | 321 | 96 | 24,200 | 23,400 | 97 |
| Example 6 | 0.1 | 48 | 275 | 261 | 95 | 22,100 | 21,200 | 96 |
| Example 7 | 1.3 | 38 | 382 | 309 | 81 | 23,900 | 21,100 | 88 |
| Comparative Example 1 | Not measurable due to almost complete dissolution | | | | | | | |
| Comparative Example 2 | Not measurable due to almost complete dissolution | | | | | | | |

EXAMPLE 8

The SPS obtained in Preparation Example was melt-extruded by the use of a single-screw tandem type extruder equipped with a T-die at an extrusion temperature of 320° C. and a shear stress of 3×10⁵ dyne/cm².

The melt-extruded resin was electrostatically charged and placed closely in contact with a metallic cooling roll adjusted to 60° C. to produce.

Then, the aforesaid shut which had been prepared in the above manner was immediately bonded onto the layer of the impact resistant atactic polystyrene resin (produced by Idemitsu Petrochemical Co., Ltd. as grade No. ET-60) which was melt-extruded with a single-screw tandem type extruder equipped with a T-die to carry out continuous lamination and subsequently, a laminate was produced by cooling solidification with a chill roll adjusted to 40° C., during which the extrusion temperature was set at 210° C. and a tension of 6 kgf was applied to SPS sheet over the width thereof of 480 mm. As a result the resultant laminate had a total thickness of 1035 m.

The SPS layer was separated from the resultant laminate and measured for its crystallinity by the method described in Example 1. The result was 15%.

Then, the sheet was indirectly heated from both the sides with an electric heater, during which the surface temperature of the sheet as measured with a non-contact thermometer was 130° C. Subsequently the sheet was thermoformed at a compressed air pressure of 3 kg/cm² by the use of a pressure forming apparatus with a mold having a 100 mm×50 mm opening and a depth of 40 mm at a mold temperature adjusted to 150° C., during which SPS layer was placed in contact with the mold surface. The SPS layer taken from the molding after thermoforming had a crystallinity of 47%.

For the purpose of evaluating the resistance against HCFC, the thermoformed molding thus obtained was exposed at the SPS side thereof to the atmosphere of HCFC 123 adjusted to 23° C. at atmospheric pressure for 24 hours, air-dried for 24 hours and measured for the rate of weight change during the exposure to determine the swell. In addition, for the purpose of testing the resistance against urethane foam, the thermoformed molding was fixed to a jig, a rigid urethane foam containing 17% by weight of HCFC 123 was bonded to the SPS surface of the molding by means of foam casting method and the resultant test piece was allowed to stand at a low temperature of −30° C. for 3 days to observe the change in appearance of the tested molding.

The results are given in Table 3.

EXAMPLE 9

The procedure in Example 8 was repeated except that a laminate was produced by the procedure described hereunder to carry out pressure forming and evaluation of the product.

The SPS obtained in the Preparation Example 1 and impact resistant atactic polystyrene resin were each separately melt-plasticized with a single-screw extruder and subjected to co-extrusion with a feed block multi-channel T-die, during which the temperatures of the molten resins at each nozzle of the extruder were 300° C. for SPS and 230° C. for atactic polystyrene (aPS). The results are given in Table 3.

EXAMPLE 10

The procedure in Example 8 was repeated except that a laminate was produced by the procedure described hereunder to carry out pressure forming and evaluation of the product.

The SPS obtained in Preparation Example 1 and impact resistant atatic polystyrene resin were each separately processed into sheets by means of the casting method. The resultant two types of sheets were laminated by means of hot pressing, during which the temperature of the surface of the nip-rolls was 180° C. The results are given in Table 3.

EXAMPLE 11

The procedure in Example 8 was repeated except that the copolymer obtained in Preparation Example 2 was used as SPS to prepare the laminate and perform pressure forming and evaluation of the product. The results are given in Table 3.

EXAMPLE 12

The procedure in Example 8 was repeated except that the mold temperature was adjusted to 90° C. at the time of pressure forming to carry out laminate preparation, pressure forming and evaluation of the product. The results are given in Table 3.

EXAMPLE 13

The procedure in Example 8 was repeated except that the mold temperature was adjusted to 30° C. at the time of pressure forming to carry out laminate preparation, pressure forming and evaluation of the product. The results are given in Table 3.

EXAMPLE 14

The procedure in Example 8 was repeated except that ABS resin was used in place of the impact resistant atactic polystyrene (aPS) to carry out laminate preparation, pressure forming and evaluation of the product. The results are given in Table 3.

COMPARATIVE EXAMPLE 3

The procedure in Example 8 was repeated except that mono-layer sheet of ABS resin was used as the raw material for pressure forming and the mold temperature was set at 50° C. at the time of pressure forming to carry out pressure forming and evaluation of the product. The results are given in Table 3.

COMPARATIVE EXAMPLE 4

The procedure in Example 8 was repeated except that mono-layer sheet of impact resistant atactic polystyrene (aPS) was used as the raw material for pressure forming and the mold temperature was set at 50° C. at the time of pressure forming to carry out pressure forming-and evaluation of the product. The results are given in Table 3.

TABLE 3

| | Laminate constitution | | Crystallinity of SPS layer | | Swell after | |
|---|---|---|---|---|---|---|
| | Raw material and thickness (μm) of inner layer | Surface layer*1 (μm) | Before thermoforming (%) | After thermoforming (%) | exposed to HCFC-123 vapor (%) | Change after urethane foam bonding |
| Example 8 | HIPS 950 | 85 | 15 | 47 | 0.0 | unchanged |
| Example 9 | HIPS 1150 | 110 | 19 | 52 | 0.1 | unchanged |
| Example 10 | HIPS 950 | 85 | 18 | 51 | 0.0 | unchanged |
| Example 11 | HIPS 1050 | 105 | 12 | 40 | 0.2 | unchanged |
| Example 12 | HIPS 1050 | 95 | 17 | 33 | 0.7 | unchanged |
| Example 13 | HIPS 1150 | 95 | 15 | 19 | 1.2 | whitened |
| Example 14 | ABS 1000 | 100 | 17 | 48 | 0.1 | unchanged |
| Comparative Example 3 | ABS 1250 | — | — | — | partial dissolution | whitened |
| Comparative Example 4 | HIPS 1100 | — | — | — | complete dissolution | cracked |

*1Same as SPS layer
HIPS: Impact resistant atactic polystyrene resin [Idemitsu Petrochemical Co., Ltd. grade ET-60]
ABS: ABS resin [Mitsubishi Monsanto Chemical Co., Ltd. grade YT-212]

As can be seen from the results given in the examples and comparative examples, the samples and test pieces of the examples according to the present invention exhibit surpassingly high resistance against HCFC even under such severe conditions that ABS resin and impact resistant atactic polystyrene resin which have been generally used as the materials for inner liner of refrigerators undergo almost complete dissolution.

As described hereinbefore, the molding to be employed in the present invention is excellent in chemical resistance, solvent resistance and resistance against CFC and HCFC, and the sheet for thermoforming and the laminate in the present invention are useful as the starting raw materials for the aforesaid molding.

According to the method of the present invention, the molding is advantageous not only in that it can be used without any problem as the inner liners of refrigerators (including internals inside door) in an atmosphere of chlorofluorohydrocarbon or in contact with heat-insulating material such as polyurethane foam, but also in that scrap resins at the time of molding can be recovered and reused.

What is claimed is:

1. A chlorofluorohydrocarbon- and chlorofluorocarbon-resistant molding, produced by thermoforming a sheet, wherein said sheet comprises a styrenic polymer having a syndiotacticity such that the proportion of racemic diad is at least 75%, a weight average molecular weight of at least 100,000, a crytallinity of 30% or less, and a thickness of 5 mm to 0.1 mm, wherein said molding has a crystallinity of 15% or more.

2. A chlorofluorohydrocarbon- and chlorofluorocarbon-resistant molding produced by thermoforming a laminate comprising at least one styrenic polymer surface layer and at least one other layer comprising a thermoplastic resin, wherein said styrenic polymer has a syndiotacticity such that the proportion of the racemic diad is at least 75%, a crystallinity of 30% or less, said surface layer has a thickness of 5 mm to 0.1 mm, and wherein said molding is a laminate comprising at least one surface styrenic polymer layer, wherein said styrenic polymer has a syndiotacticity such that the proportion of racemic diad is at least 75% and a crytallinity of 15% or more.

3. The molding according to claim 2, wherein said styrenic polymer of said laminate has a weight average molecular weight of at least 100,000.

4. The molding according to claim 2, wherein the thermoplastic resin has a glass transition temperature which is no greater than the glass transition temperature of the styrenic polymer plus 120° C.

5. The molding according to claim 2, wherein the thermoplastic resin is at least one resin selected from the group consisting of a styrenic polymer having atactic configuration, styrenic polymer having isotactic configuration, acrylonitrile triol/butadiene/styrene resin and acrylonitrile/styrene resin.

6. A chlorofluorohydrocarbon- and chlorofluorocarbon-resistant refrigerator panel, produced by thermoforming a sheet, wherein said sheet comprises a styrenic polymer having a syndiotacticity such that the proportion of racemic diad is at least 75%, a weight average molecular weight of at least 100,000, a crytallinity of 30% or less, and a thickness of 5 mm to 0.1 mm, wherein said molding has a crystallinity of 15% or more.

7. The refrigerator panel according to claim 6, wherein the styrenic polymer is further comprised of a rubber or thermoplastic resin.

8. A chlorofluorohydrocarbon- and chlorofluorocarbon-resistant refrigerator panel, produced by thermoforming a laminate comprising at least one styrenic polymer surface layer and at least one other layer comprising a thermoplastic resin, wherein said styrenic polymer has a syndiotacticity such that the proportion of the racemic diad is at least 75%, a crystallinity of 30% or less, said surface layer has a thickness of 5 mm to 0.1 m, and wherein said molding is a laminate comprising at least one surface styrenic polymer layer, wherein said styrenic polymer has a syndiotacticity such that the proportion of racemic diad is at least 75% and a crytallinity of 15% or more.

9. The refrigerator panel according to claim 8, wherein the styrenic polymer is further comprised of a rubber or thermoplastic resin.

* * * * *